(12) United States Patent
Furuta et al.

(10) Patent No.: US 7,097,306 B2
(45) Date of Patent: Aug. 29, 2006

(54) PROJECTION DEVICE AND LIQUID CRYSTAL PANEL UNIT FOR USE IN THE PROJECTION DEVICE

(75) Inventors: Yoshihiro Furuta, Neyagawa (JP); Mitsuhiro Nishiguchi, Hirakata (JP); Takafumi Goto, Nabari (JP)

(73) Assignee: Sanyo Electric Co., Ltd., Osaka (JP)

( * ) Notice: Subject to any disclaimer, the term of this patent is extended or adjusted under 35 U.S.C. 154(b) by 9 days.

(21) Appl. No.: 10/742,922

(22) Filed: Dec. 23, 2003

(65) Prior Publication Data

US 2005/0134802 A1 Jun. 23, 2005

(30) Foreign Application Priority Data

Dec. 24, 2002 (JP) ............................. 2002-371510

(51) Int. Cl.
| | |
|---|---|
| G03B 21/14 | (2006.01) |
| G03B 21/22 | (2006.01) |
| G02F 1/1335 | (2006.01) |
| G02F 1/1347 | (2006.01) |
| G02B 5/30 | (2006.01) |
| G02B 27/28 | (2006.01) |
| H04N 5/74 | (2006.01) |

(52) U.S. Cl. ................ 353/20; 353/119; 349/9; 349/75; 349/96; 349/119; 359/249; 359/499; 348/751; 348/761

(58) Field of Classification Search ............... 353/20, 353/30, 31, 34, 37, 77, 78, 81, 82, 84, 98, 353/99, 119, 122; 349/5, 7–9, 33, 54, 74, 349/75, 102, 117, 119–121, 181, 192, 96; 359/249, 256, 281, 484, 485, 494, 497, 499, 359/900; 348/739, 744, 747, 752, 762, 767, 348/751, 761

See application file for complete search history.

(56) References Cited

U.S. PATENT DOCUMENTS

| | | | |
|---|---|---|---|
| 6,243,065 B1 * | 6/2001 | Robrish et al. | 345/97 |
| 6,301,044 B1 * | 10/2001 | Huber et al. | 359/483 |
| 6,473,180 B1 * | 10/2002 | Hirosawa | 356/364 |
| 2002/0018162 A1 * | 2/2002 | Suzuki et al. | 349/117 |

FOREIGN PATENT DOCUMENTS

JP 2000-39591 2/2000

* cited by examiner

*Primary Examiner*—W. B. Perkey
*Assistant Examiner*—Rochelle Blackman
(74) *Attorney, Agent, or Firm*—Westerman, Hattori, Daniels & Adrian, LLP.

(57) ABSTRACT

A projection device includes on a chassis a liquid crystal panel for irradiation with light from a light source, a polarizing plate opposing the liquid crystal panel, and an optical compensation sheet provided between the liquid crystal panel and the polarizing plate, for compensating a twist angle of polarized light. The optical compensation sheet is attached to a rotational adjusting mechanism provided on the chassis so that it can be rotatively adjusted within a plane perpendicular to an optical axis L.

5 Claims, 6 Drawing Sheets

PROJECTION DEVICE AND LIQUID CRYSTAL PANEL UNIT FOR USE IN THE PROJECTION DEVICE

BACKGROUND OF THE INVENTION

1. Field of the Invention

The present invention relates to projection devices in which an optical compensation sheet is arranged between a liquid crystal panel and a light polarizing plate.

2. Description of Related Art

FIGS. 8(a) and 8(b) are exploded oblique views of a liquid crystal panel 7 and light polarizing plates 73 and 74 that sandwich the liquid crystal panel 7. FIG. 8(a) shows a state in which no electric field is applied across the liquid crystal panel 7, whereas FIG. 8(b) shows a state in which an electric field is applied across the liquid crystal panel 7. As is well-known, each of the polarizing plates 73 and 74 allows the passage of only one of two polarized light components perpendicular to each other, and the polarizing plates 73 and 74 are arranged so that the oscillation planes of the polarized light components that are allowed to pass through them are 90 degrees apart from each other. The oscillation planes of the polarizing plates 73 and 74 must be exactly 90 degrees apart. In view of this, a configuration is known in which the polarizing plates 73 and 74 are rotationally adjusted within a plane perpendicular to the optical axis of the liquid crystal panel 7 (see Japanese Laid-Open Pat. App. Pub. No. 2000-39591).

The liquid crystal panel 7 is configured by enclosing liquid crystal molecules 57 between transparent display substrates 70 and 71. The two display substrates 70 and 71 are subjected to a rubbing process, and the rod-like liquid crystal molecules 57 are contained between the two display substrates 70 and 71 with the director of the molecules being twisted.

The liquid crystal panel 7 is of a so-called normally white type, in which, when no electric field is applied between the display substrates 70 and 71, the polarized light that has been transmitted through polarizing plate 73, the incident side, passes through polarizing plate 74, the output side, with its direction being bent 90 degrees due to the twist of the directors of the liquid crystal molecules 57, as shown in FIG. 8(a). As a consequence, the liquid crystal panel 7 appears bright, i.e., white.

As shown in FIG. 8(b), when an electric field is applied between the display substrates 70 and 71, the liquid crystal molecules 57 align vertically, and consequently the polarized light that has been transmitted through the incident-side polarizing plate 73 passes through the interstices between the liquid crystal molecules 57. The polarized light is blocked by the output-side polarizing plate 74, and thus the liquid crystal panel 7 appears black. The liquid crystal panel 7 displays an image by switching the presence/absence of the electric field in each of the microspaces.

It is known that in practice, however, in the liquid crystal panel 7, when an electric field is applied between the display substrates 70 and 71, the tilt angles of the liquid crystal molecules 57 continuously change along the thickness direction of the liquid crystal panel 7, as shown in FIG. 9. As a consequence, when an electric field is applied between the display substrates 70 and 71, light leakage occurs due to the birefringence of the liquid crystal molecules 57 in the vicinity of the substrates 70 and 71, causing contrast reduction, as is known.

In recent years, there has been a demand for greater image resolution. The devices that display such high-resolution images are required to maximize the contrast between black color and white color in projected images and project images clearly. If due to the birefringence of the liquid crystal molecules 57 just mentioned, the polarized light that should be blocked is transmitted through the liquid crystal panel 7 as indicated by the dot-dashed line in FIG. 8(b), black colors are not completely displayed black. Herein, "birefringence" indicates that the speed at which light propagates differs depending on the orientation of the plane in which it oscillates, and the orientation in which the speed is fast will be referred to as the "fast axis," whereas the direction in which the speed is slow will be referred to as the "slow axis."

In view of this, it has been suggested to provide optical compensation sheets 8 and 8a in which liquid crystal molecules 58 are arrayed along the thickness direction between the liquid crystal panel 7 and the incident/output-side polarizing plates 73 and 74, as shown in FIG. 9.

These are transparent sheets in which approximately disk-shaped liquid crystal molecules 58 composed of a discotic liquid crystal compound are aligned. The discotic liquid crystal compound is a chemical compound in which ester molecules are layered with benzene rings serving as cores.

The tilt angles of the liquid crystal molecules 58 change continuously along the thickness direction of the sheet, and the outermost liquid crystal molecules 58 are arranged substantially horizontally. As a result, the birefringence of the liquid crystal molecules 57 in the liquid crystal panel 7 is compensated, and thus light leaking from the liquid crystal panel 7 is not transmitted through the polarizing plate 74. Consequently, black colors can be reproduced completely black on the liquid crystal panel 7, maximizing the contrast.

These optical compensation sheets 8 and 8a are attached on to the polarizing plates 73 and 74 in many cases. The alignment orientation of the liquid crystal molecules 58 in the optical compensation sheets 8 and 8a needs to be parallel to the orientation of the display substrates 70 and 71.

The applicant, however, has found the following problems.

The optical compensation sheets 8 and 8a should be attached on to the polarizing plates 73 and 74 so that the alignment orientation of the liquid crystal molecules 58 is parallel to the orientation of the display substrates 70 and 71.

Nevertheless, there are cases in which the alignment orientation of the liquid crystal molecules 58 in the optical compensation sheets 8 and 8a does not turn out parallel to the orientation of the substrates because of error in attaching the optical compensation sheets 8 and 8a to the polarizing plates 73 and 74.

What is more, the optical compensation sheets 8 are cut out from a film sheet 85 into a desired dimension, but, as shown in FIG. 10, there are cases in which the cutting lines accidentally deviate, as indicated by the dotted lines, from the proper position.

In the optical compensations sheets 8 thus produced, the alignment orientation of the liquid crystal molecules 58 deviate from the originally intended orientation. As a result, light that must be blocked is allowed to pass through. Consequently, partial leakage of light occurs, into an area is essentially supposed to display black, causing display patchiness. Furthermore, since the optical compensation sheets 8 are affixed to the polarizing plates 73 and 74, if contrast reduction or display patchiness occurs it has been necessary to replace the optical compensation sheets 8 with different optical compensation sheets 8 having different optical axes. This makes it necessary to stock a variety of optical compensation sheets 8 having various optical axes, inviting adverse consequences such incidents of unneeded stock.

The applicant has conceived rotatively adjusting the alignment orientation of the liquid crystal molecules 58 in the optical compensation sheet 8 within a plane orthogonal to the optical axis to project uniform images having distinct contrast between black and white colors.

BRIEF SUMMARY OF THE INVENTION

It is therefore an object of the present invention to provide a projection device furnished with an optical compensation sheet 8 that is capable of projecting uniform images having a sharp contrast between black and white colors.

The present invention provides a projection device comprising: a liquid crystal panel 7 enclosing liquid crystal molecules 57, the liquid crystal panel for irradiation with light from a light source 35; a polarizing plate 73 opposing the liquid crystal panel; and an optical compensation sheet 8 arranged between the liquid crystal panel 7 and the polarizing plate 73, for compensating birefringence of the liquid crystal molecules 57; wherein the optical compensation sheet 8 is attached to a rotational adjusting mechanism 1 provided on a chassis 3 so as to be rotatively adjustable within a plane perpendicular to an optical axis L.

The rotational adjusting mechanism 1 comprises a first rotation plate 2 on which the optical compensation sheet 8 is fitted, and a second rotation plate 6 on which the polarizing plate 73 is fitted, the rotation plates 2 and 6 being spaced apart from and opposing one another; and a guide shaft 60 protruding from one of the rotation plates for fitting into a slit 20 opening in the other rotation plate, so that the rotation plates can be rotatively adjusted independently of one another.

Because the optical compensation sheet 8 is rotatively adjusted within a plane perpendicular to the optical axis L, the alignment orientation of the liquid crystal molecules 58 in the optical compensation sheet 8 can be set precisely parallel to the alignment orientation of the liquid crystal panel 7. This makes it possible to project uniform images having a sharp contrast between black and white colors.

In addition, the fact that the first rotation plate 2 and the second rotation plate 6 that make up the rotational adjusting mechanism 1 are adjusted independently of one another means that the adjustment to one of the rotation plates does not cause displacement of the other one of rotation plates, ensuring stability in the adjustment.

DETAILED DESCRIPTION OF THE PREFERRED EMBODIMENTS

With reference to the drawings, one example of the present invention is described in detail below.

Figure 1:
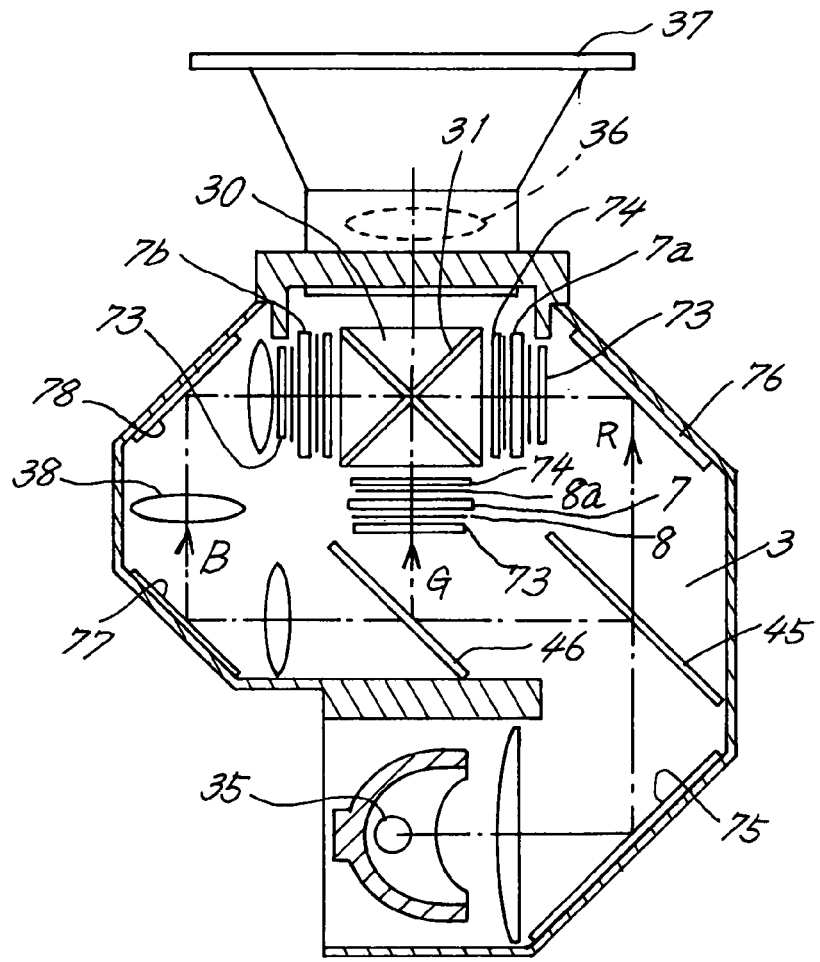
FIG. 1 is a plan view of a projection device.

FIG. 1 is a plan view showing a projection device pertaining to the present example. The device is furnished with three liquid crystal panels 7, 7*a*, and 7*b* corresponding to three primary colors of light, red (R), green (G), and blue (B), on a chassis 3. These panels are irradiated with intense light emanating from a light source 35, and the light rays transmitted through the liquid crystal panels are combined to project images on a screen. Although a feature of the present example lies in rotation-adjustment of an optical compensation sheet 8, the overall configuration is described first.

In the chassis 3, the liquid crystal panels 7*a* and 7*b* corresponding to red and blue, respectively, are arranged opposing each other with the optical axis of a projection lens 36 interposed therebetween, and a prism body 30 is arranged between the liquid crystal panels 7*a* and 7*b*. The liquid crystal panel 7 corresponding to green is provided on the opposite side from the projection lens 36 with the prism body 30 interposed therebetween.

A light source 35 is arranged at the entrance of the light path to the chassis 3, and on the light path, total reflection mirrors 75, 76, 77, and 78 as well as dichroic mirrors 45 and 46 are arranged, all of which are tilted with respect to the light path.

The light emanating from the light source 35 is reflected by the total reflection mirror 75. Thereafter, the dichroic mirror 45 allows the red component to be transmitted therethrough, while it reflects green and blue components. Then, the red component is reflected by the total reflection mirror 76, is projected on to the liquid crystal panel 7*a* corresponding to red, and is directed toward the projection lens 36 by the prism body 30. The green component reflects off the dichroic mirror 46 and is incident on the prism body 30, and the incident light passes through the prism body 30, entering the projection lens 36. The blue component is reflected by the total reflection mirror 77, traveling through a relay lens 38, and is then reflected by a complex mirror 31 in the prism body 30, entering the projection lens 36, so that it is projected on to a screen 37.

Figure 2:
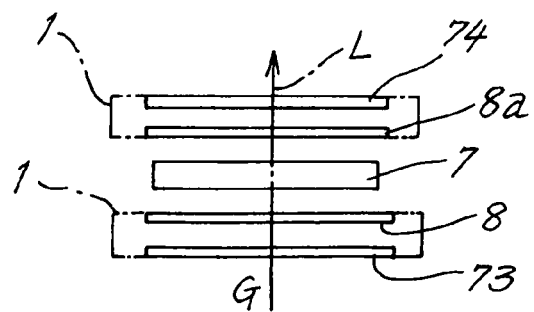
FIG. 2 is an enlarged plan view of a periphery of a liquid crystal panel for green.

FIG. 2 is an enlarged plan view showing the liquid crystal panel 7 corresponding to green and its periphery. It should be noted that the peripheries of respective liquid crystal panels 7*a* and 7*b* corresponding to red and blue also have a similar configuration to the periphery of the liquid crystal panel 7 corresponding to green, but only the liquid crystal panel 7 corresponding to green is illustrated for the sake of convenience in explanation.

Respective polarizing plates 73 and 74 are arranged on the incident side and output side of the liquid crystal panel 7. As is well-known, when no electric field is applied across the liquid crystal panel 7, one component of the polarized light that has been transmitted through the incident-side polarizing plate 73 (assumed to be p-wave) is twisted in the liquid crystal panel 7 so that the polarization angle is changed to be s-wave that is perpendicular to the p-wave, and is transmitted through the output-side polarizing plate 74.

An incident-side optical compensation sheet 8 is arranged between the liquid crystal panel 7 and the incident-side polarization plate 73, while an output-side optical compensation sheet 8a is arranged between the liquid crystal panel 7 and the output-side polarization plate 74.

The incident-side polarization plate 73 and the incident-side optical compensation sheet 8, and the output-side polarization plate 74 and the output-side optical compensation sheet 8a are attached to respective rotational adjusting mechanisms 1, 1 so that they can be rotatively adjusted within a plane perpendicular to an optical axis L.

Figure 3:
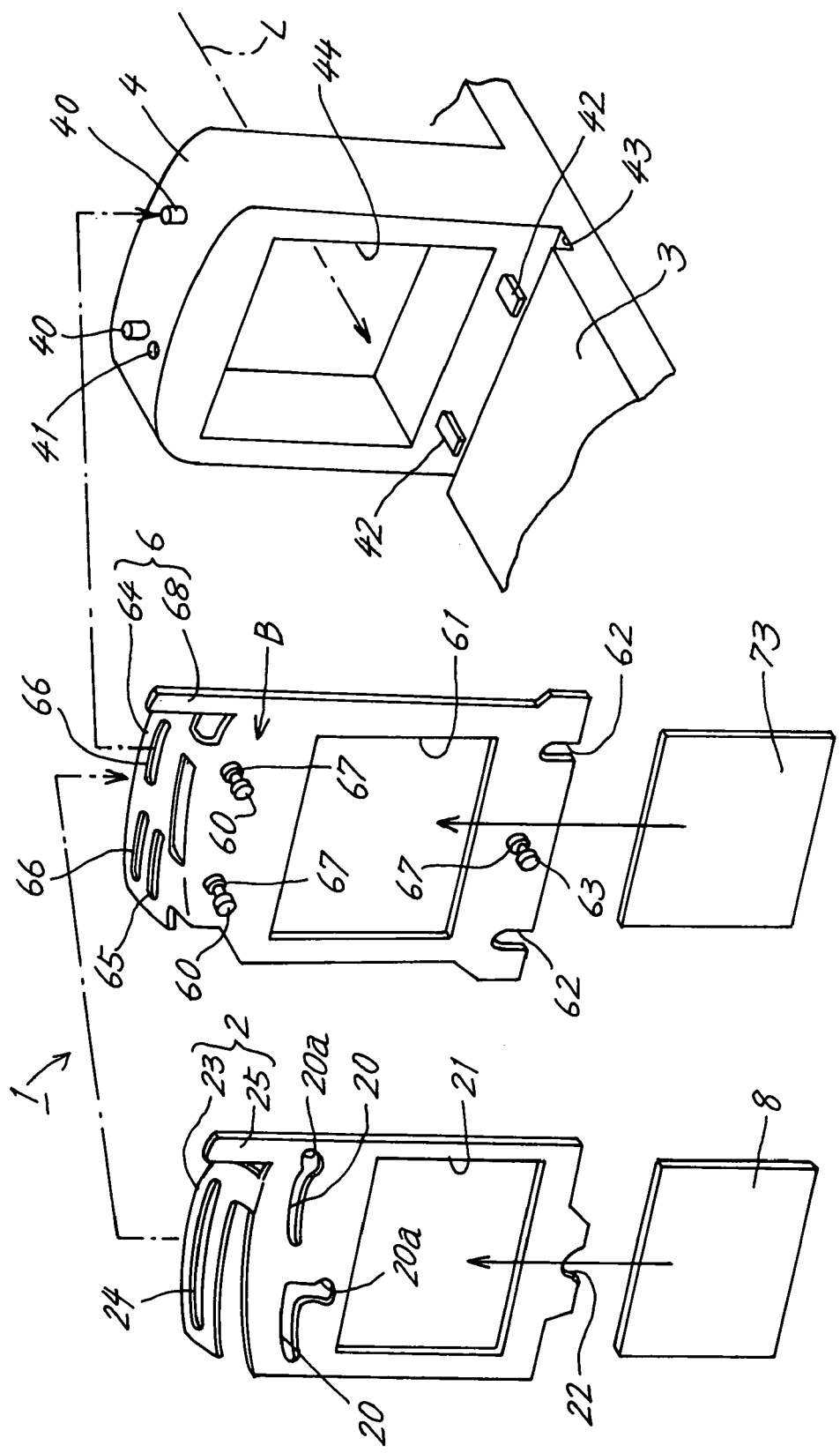
FIG. 3 is an exploded oblique view of a rotational adjusting mechanism to which an incident-side polarization plate and an incident-side optical compensation sheet are attached.

FIG. 3 is an exploded oblique view showing an rotational adjusting mechanism 1 to which the incident-side polarization plate 73 and the incident-side optical compensation sheet 8 are attached. It should be noted that the output-side polarization plate 74 and the output-side optical compensation sheet 8a are also attached to a rotational adjusting mechanism 1 having the same configuration.

The rotational adjusting mechanism 1 is furnished with a first rotation plate 2 affixed to a thin glass plate (not shown), to which the optical compensation sheet 8 is to be attached, and a second rotation plate 6, to which the polarizing plate 73 is to be attached. As will be described later, the two rotation plates 2 and 6 are rotatively adjusted independently of one another. The rotational adjusting mechanism 1 is mounted onto a wall piece 4 erected from the chassis 3.

The first rotation plate 2 has a through opening 21 in which the optical compensation sheet 8 is fitted substantially at the center with respect to its height, and two arc-shaped slits 20, 20 in its upper end portion. One ends of the arc-shaped slits 20, 20 have expanded portions 20a, 20a that are formed to be larger in the vertical width than the arc-shaped slits 20, 20.

Provided in the lower end of the first rotation plate 2 is a notch 22. A first protruding plate 23 bulging upwardly in a substantially arc shape protrudes from above the arc-shaped slits 20, 20 in the first rotation plate 2 toward the wall piece 4. The first protruding plate 23 has a first long slit 24 extending horizontally. The right end of the first rotation plate 2 extends upward, forming a knob 25 to be operated by the finger of an adjusting operator.

The second rotation plate 6 has a through opening 61 in which the polarizing plate 73 is attached, opened at substantially the center with respect to its height, and two guide shafts 60, 60 protrude from the upper end area thereof toward the first rotation plate 2. Two notches 62, 62 are opened in the lower end of the second rotation plate 6. From an area on the second rotation plate 6 that is below the through opening 61, a rotation-support shaft 63 protrudes toward the first rotation plate 2.

Figure 5:
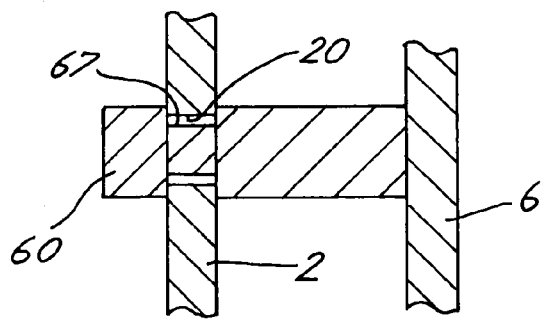
FIG. 5 is a cross-sectional view showing a first rotation plate fitted into a groove, viewed in the direction B in FIG. 3.

The guide shafts 60, 60 and the rotation-support shaft 63 have grooves 67, 67, 67 formed therearound. The first rotation plate 2 is fitted in such a manner that the guide shafts 60, 60 are inserted into the expanded portions 20a, and thereafter, the peripheral edges of the arc-shaped slits 20, 20 are fitted to the grooves 67, 67 (see FIG. 5). The notch 22 of the first rotation plate 2 fits in the groove 67 of the rotation-support shaft 63. Thus, the distance between the first rotation plate 2 and the second rotation plate 6 is kept to be invariable.

A second protruding plate 64 bulging upwardly in an arc shape protrudes from above the guide shafts 60, 60 on the second rotation plate 6 toward the wall piece 4. The second protruding plate 64 has a second long slit 65 and two third long slits 66, 66 opened therein. The right end of the second rotation plate 6 extends upward, forming a knob 68 to be operated by the finger of an adjusting operator.

The first rotation plate 2 rotates around the rotation-support shaft 63 within a plane perpendicular to the optical axis L, and the rotation is guided by the arc-shaped slits 20, 20 being fitted to the guide shafts 60, 60. In addition, the first protruding plate 23 overlaps with the second protruding plate 64, and the first long slit 24 overlaps with the second long slit 65.

The wall piece 4 has a through opening 44 through which light passes, opened at the center with respect to its height, and the upper end surface thereof is provided with protruding shafts 40, 40 and a screw hole 41. Mounting protuberances 42, 42 protrude from the lower end portion of the wall piece 4, and a recessed groove 43 is formed below the mounting protuberances 42, 42 on the chassis 3. The lower end of the second rotation plate 6 fits into the recessed groove 43. The mounting protuberances 42, 42 fit into the notches 62, 62 of the second rotation plate 6, so that the second rotation plate 6 rotates around either one of the mounting protuberances 42, 42 within a plane perpendicular to the optical axis L.

Gaps are provided laterally between each of the mounting protuberances 42 and the notches 62, permitting the second rotation plate 6 to rotate. The protruding shafts 40, 40 fit into the third long slits 66, 66 of the second rotation plate 6, guiding the rotation of the second rotation plate 6.

Rotation-Adjustment of Polarizing Plate

Figure 4:
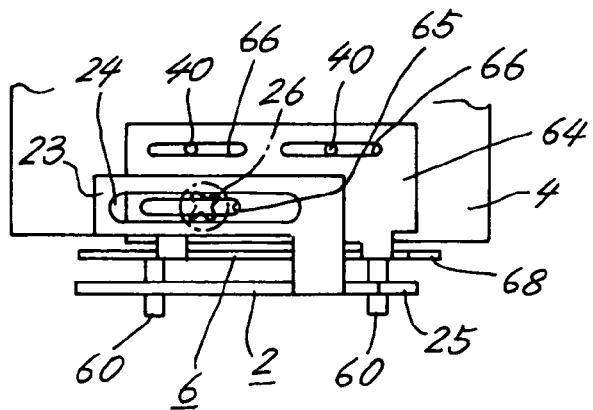
FIGS. 4(*a*), 4(*b*), and 4(*c*) are plan views showing an adjustment operation.
Figure 4:
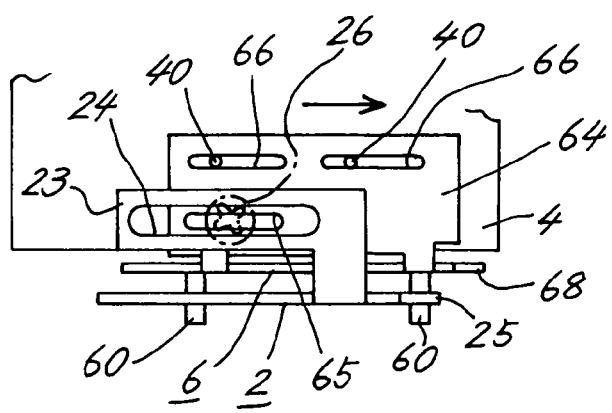
Figure 4:
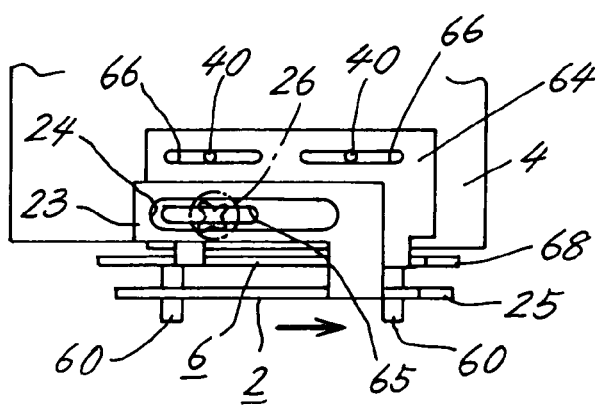
Figure 6:
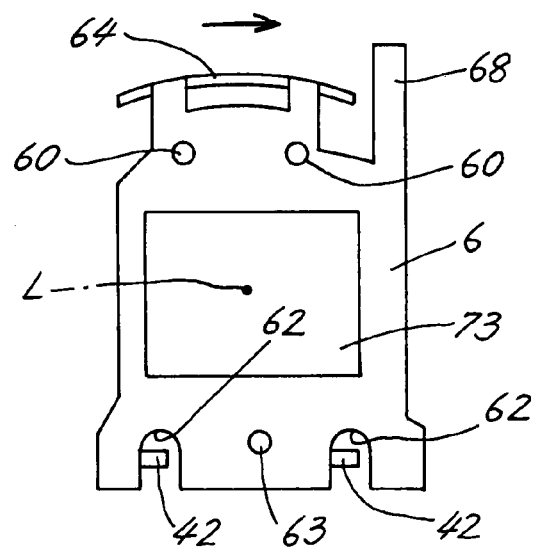
FIGS. 6(*a*) and 6(*b*) are front views showing the rotating state of a second rotation plate and the rotating state of the first rotation plate, respectively.
Figure 6:
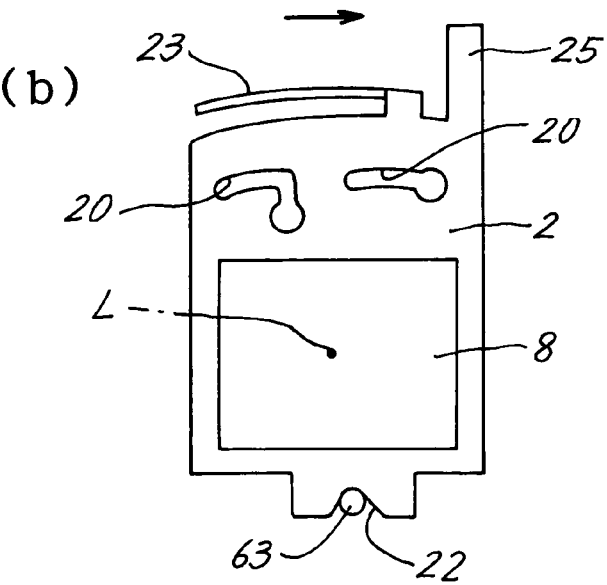

FIGS. 4(a), 4(b), and 4(c) are plan views showing adjustment operations, and FIGS. 6(a) and 6(b) are front views respectively showing how the second rotation plate and the first rotation plate rotate. As shown in FIG. 4(a), with the first long slit 24 and the second long slit 65 overlapping, a set screw 26 is passed through both the long slits 24 and 65 from above and is screwed into a screw hole 41 in the wall piece 4.

To rotation-adjust the polarizing plate 73, the second rotation plate 6 is rotated. The set screw 26 is loosened, the knob 68 of the second rotation plate 6 is held with the fingers from above, and as shown in FIG. 4(b), the second rotation plate 6 is moved to the right. Of course, it may be moved to the left. Since the notches 62, 62 are fitted onto the mounting protuberances 42, 42 as shown in FIG. 3, the second rotation plate 6 rotates around the contact points of the mounting protuberances 42, 42 and the peripheral edges of the notches 62, 62 within a plane perpendicular to the optical axis L, as shown in FIG. 6(a). At this time, the first rotation plate 2 does not rotate. After completing the rotation-adjustment, the set screw 26 is tightened.

Rotation-Adjustment of Optical Compensation Sheet

To rotation-adjust the optical compensation sheet 8, the first rotation plate 2 is rotated. The set screw 26 is loosened, a knob 25 of the first rotation plate 2 is held with the fingers from above, and as shown in FIG. 4(c), the second rotation plate 6 is moved to the right. Of course, it may be moved to the left. Since the notch 22 is fitted onto the rotation-support shaft 63 as shown in FIG. 3, as shown in FIG. 6(b), the first rotation plate 2 rotates around the rotation-support shaft 63 within a plane perpendicular to the optical axis L. At this time, the second rotation plate 6 does not rotate. After completing the rotation-adjustment, the set screw 26 is tightened.

As described above, the first rotation plate 2 and the second rotation plate 6 move separately, and they do not operate inter-connectedly. In addition, the rotation plates 2 and 6 are accessed for the adjustment from above. This makes the adjusting operation stable and easy. It should be noted that the adjustment may be carried out with a jig (not shown) inserted from above the rotation plates 2 and 6.

The optical compensation sheet 8 is rotatively adjusted within a plane perpendicular to the optical axis L, and therefore, the alignment orientation of the liquid crystal molecules 58 in the optical compensation sheet 8 can be set precisely parallel to the alignment orientation of the liquid crystal panel 7. Consequently, it becomes possible to project uniform images having a sharp contrast between black and white colors. Moreover, unlike conventional cases, it is unnecessary to have a variety of optical compensation sheets 8 having various optic axes in stock, eliminating the problem of excess in stock or the like.

In rotatively adjusting the optical compensation sheet 8, the light source 35 is turned on to display an image on the screen 37 through the projection lens 36, and the optical compensation sheet 8 and the polarizing plate 73 are adjusted by rotating the rotation plates 2 and 6 so that the contrast between black and white colors becomes sharp.

Figure 7:
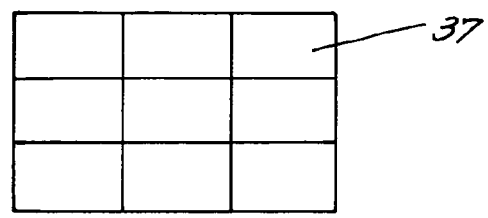
FIG. 7 is a front view of a screen.
Figure 8:
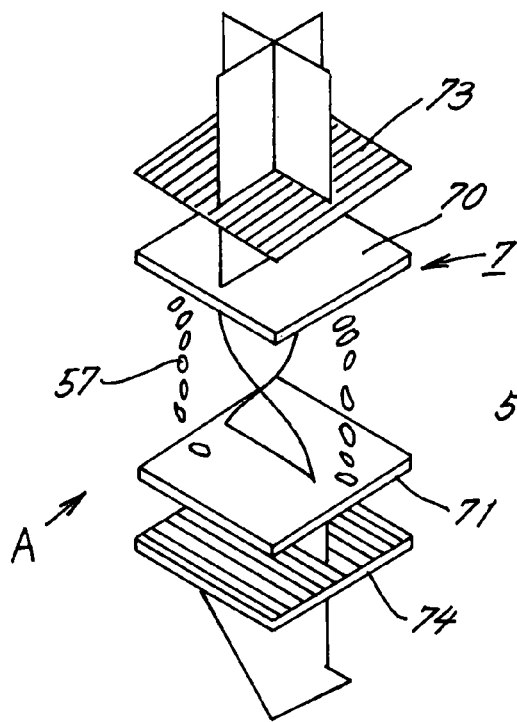
FIGS. 8(*a*) and 8(*b*) are exploded oblique views of a liquid crystal panel and polarizing plates, FIG. 8(*a*) showing the state in which no electric field is applied across the liquid crystal panel and FIG. 8(*b*) showing the state in which an electric field is applied across the liquid crystal panel.
Figure 8:
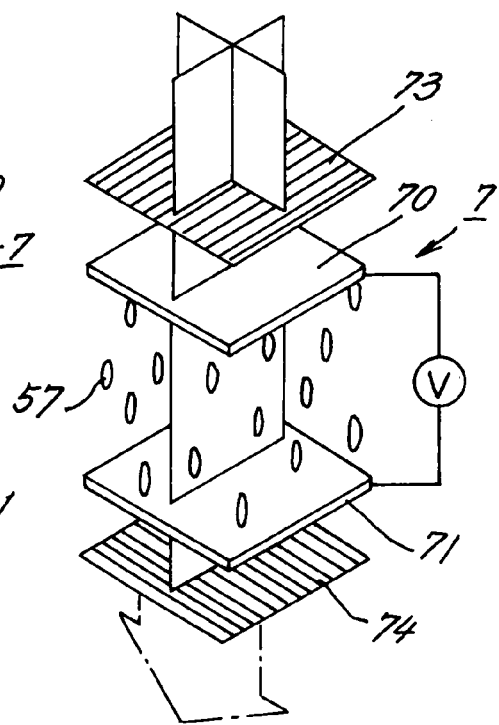
Figure 9:
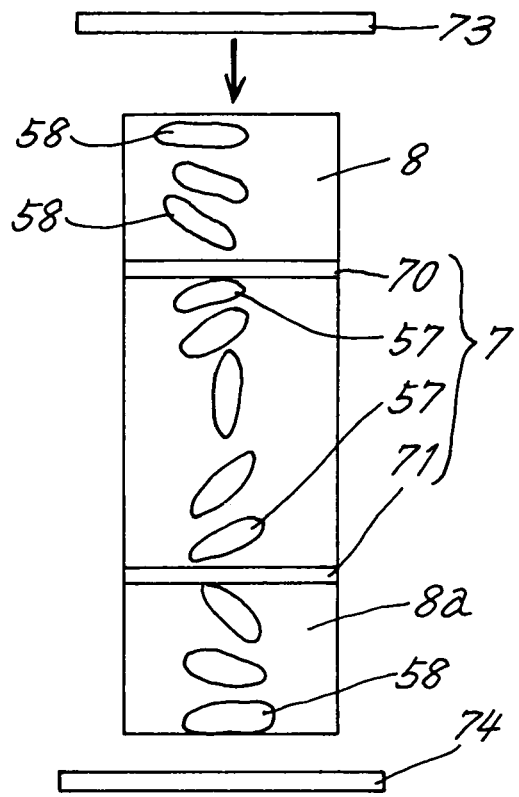
FIG. 9 is a front view of the liquid crystal panel of FIG. 8, viewed from the direction A in FIG. 8, on which optical compensation sheets are attached.
Figure 10:
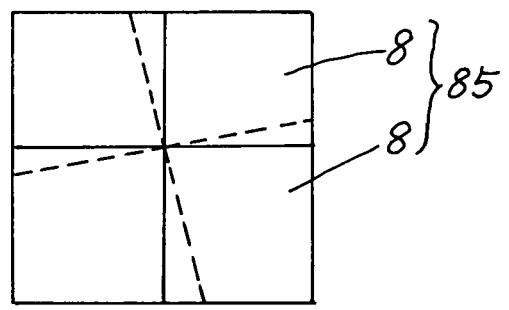
FIG. 10 is a view showing how optical compensation sheets are cut out from a film sheet.

The applicant has confirmed the effect of the present invention by obtaining the contrast ratio between black and white colors after rotatively adjusting the optical compensation sheets 8 and 8a and the polarizing plates 73 and 74. First, the light source 35 was turned on, but no electric field was applied across the liquid crystal panel 7 to display a white color on the screen 37. As shown in FIG. 7, the screen area of the screen 37 was divided into nine areas, and the illuminance of the center of each of the divided screen areas was measured. The mean value of the illuminances (unit: lux) of the nine screen areas was obtained, and the mean value thus obtained is called "Wave."

Next, an electric field is applied across the liquid crystal panel 7 to display a black color on the screen 37. In a like manner as the foregoing, the screen area of the screen 37 is divided into nine areas, and the illuminance of the center of each of the divided screen areas was measured. The mean value of the illuminances of the nine screen areas was obtained, and the mean value thus obtained is called "BRave."

The ratio of Wave and BRave thus obtained was about 800:1. When the optical compensation sheets 8 and 8a were not provided in front of and at the back of the liquid crystal panel 7, the ratio of Wave and BRave was about 400:1. This proves that the contrast between black and white colors was improved.

In the foregoing embodiment, the incident side and the output side of the liquid crystal panel 7 are provided with the optical compensation sheets 8 and 8a, respectively, but only one of the incident side or the output side may be provided with the optical compensation sheet.

Further, the rotational adjusting mechanism of the optical compensation sheet 8 is not limited to the configuration shown in FIG. 3. For example, it is possible to adopt the conventional adjusting mechanism disclosed in Japanese Laid-Open Pat. App. Pub. No. 2000-39591.

In addition, although the foregoing embodiment has described the rotation-adjustment within a plane perpendicular to the optical axis L, a sufficiently advantageous effect can be obtained even for the rotation-adjustment within a plane inclined off the optical axis L.

In the foregoing embodiment, the guide shafts 60, 60 protrude from the second rotation plate 6, and the arc-shaped slits 20, 20 are formed in the first rotation plate 2; however, the guide shafts 60, 60 may protrude from the first rotation plate 2, and the arc-shaped slits 20, 20 may be formed in the second rotation plate 6. Moreover, the configuration of the present invention may be applied to a so-called normally black liquid crystal panel 7, which appears black when no electric field is applied thereto.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A projection device comprising:
    a normally white type liquid crystal panel enclosing liquid crystal molecules, the liquid crystal panel for irradiation with light from a light source;
    a polarizing plate opposing the liquid crystal panel;
    a rotational adjusting mechanism provided on a chassis so as to be rotatively adjustable within a plane orthogonal to an optical axis (L); and
    an optical compensation sheet arranged between the liquid crystal panel and the polarizing plate, for compensating birefringence of the liquid crystal molecules, the optical compensation sheet being attached to the rotational adjusting mechanism,
    wherein birefringence of the light through the liquid crystal panel by the liquid crystal molecules is compensated by rotating the optical compensation sheet,
    wherein the rotational adjusting mechanism comprises a first rotation plate on which the optical compensation sheet is fitted, and a second rotation plate on which the polarizing plate is fitted, the rotation plates being spaced apart from and opposing one another, so that the rotation plates are rotatively adjustable independently of one another.

2. The projection device as set forth in claim 1, further comprising:
    a guide shaft protruding from one of the rotation plates for fitting into a slit opening in the other rotation plate, so that the rotation plates can be rotatively adjusted independently of one another.

3. The projection device as set forth in claim 1, wherein the rotational adjusting mechanism is disposed on at least either a light incident side or a light output side of the liquid crystal panel.

4. The projection device as set forth in claim 2, wherein the rotation plates are arranged for adjustment from above the liquid crystal panel.

5. A liquid crystal panel unit comprising:
    a normally white type liquid crystal panel enclosing liquid crystal molecules, the liquid crystal panel for irradiation with light from a light source;
    a polarizing plate opposing the liquid crystal panel; and
    an optical compensation sheet arranged between the liquid crystal panel and the polarizing plate, for compensating birefringence of the liquid crystal molecules;
    wherein the optical compensation sheet is attached to a rotational adjusting mechanism provided on a chassis so as to be rotatively adjustable within a plane perpendicular to an optical axis L,
    wherein birefringence of the light through the liquid crystal panel by the liquid crystal molecules is compensated by rotating the optical compensation sheet,
    wherein the rotational adjusting mechanism comprises a first rotation plate on which the optical compensation sheet is fitted, and a second rotation plate on which the polarizing plate is fitted, the rotation plates being spaced apart from and opposing one another, so that the rotation plates are rotatively adjustable independently of one another.

* * * * *